United States Patent
Lobo et al.

(10) Patent No.: US 10,565,262 B2
(45) Date of Patent: Feb. 18, 2020

(54) METHODS FOR REFINING SEARCH RESULTS IN AN APPLICATION

(71) Applicant: Apple Inc., Cupertino, CA (US)

(72) Inventors: Philomena F. Lobo, Santa Clara, CA (US); Uday M. Mantripragada, San Jose, CA (US); Vijay Raman, San Jose, CA (US); Tejaswi Tenneti, San Jose, CA (US); Ryan D. Shelby, Mountain View, CA (US); Jae Woo Chang, San Jose, CA (US); Peter W. Roman, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 579 days.

(21) Appl. No.: 15/274,802

(22) Filed: Sep. 23, 2016

(65) Prior Publication Data

US 2017/0357733 A1    Dec. 14, 2017

Related U.S. Application Data

(60) Provisional application No. 62/348,822, filed on Jun. 10, 2016.

(51) Int. Cl.
| | |
|---|---|
| *G06F 17/30* | (2006.01) |
| *G06F 16/9032* | (2019.01) |
| *G06F 3/0482* | (2013.01) |
| *G06F 3/0485* | (2013.01) |
| *G06F 3/0481* | (2013.01) |
| *G06F 16/28* | (2019.01) |
| *G06F 16/9537* | (2019.01) |

(52) U.S. Cl.
CPC ...... *G06F 16/90328* (2019.01); *G06F 3/0482* (2013.01); *G06F 3/0485* (2013.01); *G06F 3/04817* (2013.01); *G06F 16/285* (2019.01); *G06F 16/9537* (2019.01)

(58) Field of Classification Search
None
See application file for complete search history.

(56) References Cited

U.S. PATENT DOCUMENTS

| | | | | |
|---|---|---|---|---|
| 7,987,195 | B1 * | 7/2011 | Li | G06F 16/9537 707/765 |
| 8,364,521 | B2 * | 1/2013 | Ramer | G06Q 30/0267 455/414.1 |
| 9,043,148 | B2 * | 5/2015 | Bourque | G01C 21/3611 701/532 |
| 9,405,832 | B2 * | 8/2016 | Edwards | G06F 16/951 |
| 9,773,018 | B2 * | 9/2017 | Cheung | G06Q 30/00 |
| 9,811,589 | B2 * | 11/2017 | Ramer | G06Q 30/02 |
| 2013/0268540 | A1 * | 10/2013 | van Dijk | G06F 16/9537 707/748 |

(Continued)

*Primary Examiner* — Debbie M Le
(74) *Attorney, Agent, or Firm* — Jaffery Watson Mendonsa & Hamilton LLP

(57) ABSTRACT

Disclosed herein is a technique for refining search results presented in a graphical user interface of a search application operating at a user device. A scrollable category list is presented in the graphical user interface, where the scrollable category list includes a number of categories related to a search query provided by a user of the user device. Categories that are available within a geographic region associated with a location of the user device are included in the scrollable category list.

20 Claims, 10 Drawing Sheets

(56) References Cited

U.S. PATENT DOCUMENTS

| | | | |
|---|---|---|---|
| 2014/0032325 A1* | 1/2014 | Weiss | G06Q 30/0261 |
| | | | 705/14.58 |
| 2015/0142565 A1* | 5/2015 | Wang | G06O 30/0261 |
| | | | 705/14.54 |
| 2017/0067748 A1* | 3/2017 | Glover | G01C 21/20 |
| 2018/0025010 A1* | 1/2018 | Ramer | H04L 67/22 |
| | | | 707/727 |

* cited by examiner

METHODS FOR REFINING SEARCH RESULTS IN AN APPLICATION

CROSS-REFERENCE TO RELATED APPLICATION

The present application claims the benefit of U.S. Provisional Application No. 62/348,822, entitled "METHODS FOR REFINING SEARCH RESULTS IN AN APPLICATION" filed Jun. 10, 2016, the content of which is incorporated herein by reference in its entirety for all purposes.

FIELD

The described embodiments set forth a technique for dynamically refining search results presented in a graphical user interface of an application operating at a computing device.

BACKGROUND

Typically, in response to a search query, a user is provided with a broad list of search results that may or may not be entirely relevant to the search query. Also, even when the search results are relevant to the search query, the user generally has to perform the tedious task of going through the search results to find the particular result in which he or she is interested. This deteriorates the searching experience for the user. Therefore, there is a need for a system that is capable of intelligently and dynamically refining the search results related to the search query to allow the user to quickly and efficiently locate particular search results of interest.

SUMMARY

Representative embodiments set forth herein disclose various techniques for refining search results presented in a graphical user interface of a search application operating at a user device. In particular, the embodiments set forth various techniques for determining suggestion information that can be presented to a user in response to search queries. The user device sends, to a server device, location data including a current location of the user device and input data corresponding to a search query. The input data includes a selection of a category (e.g., restaurants) from a first list of categories (e.g., restaurants, drinks, travel, etc.) presented in graphical user interface. In response to receiving the input data, the server device dynamically determines suggestion information corresponding to the input data. The suggestion information includes a second list of categories (e.g., "Popular" restaurants, "American" restaurants, "Italian" restaurants, etc.) that includes sub-categories for restaurants that are available in a geographic region defined by the location data. The suggestion information also includes a subset of search results that corresponds to each category in the second list of categories. This suggestion information, when presented to the user at the user device, can assist the user in rapidly filtering through the search results and locating particular search results of interest.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings that illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for providing a user with multiple suggestions in a graphical user interface of a search application in response to a search query. The suggestions include categories that are related to the search query and are dynamically generated based on availability of the categories in a geographic region associated with a location of a user device operating the search application. The suggestions include selectable icons presented in a scrollable portion of the graphical user interface. Selection of a particular icon causes a narrower set of search results corresponding to the selected icon to be displayed in the graphical user interface.

Accordingly, the techniques described herein provide a mechanism for refining search results presented in a search application. A more detailed discussion of these techniques is set forth below and described in conjunction with FIGS. 1, 2, 3A-3E, and 4-6, which illustrate detailed diagrams of systems and methods that can be used to implement these techniques.

Figure 1:
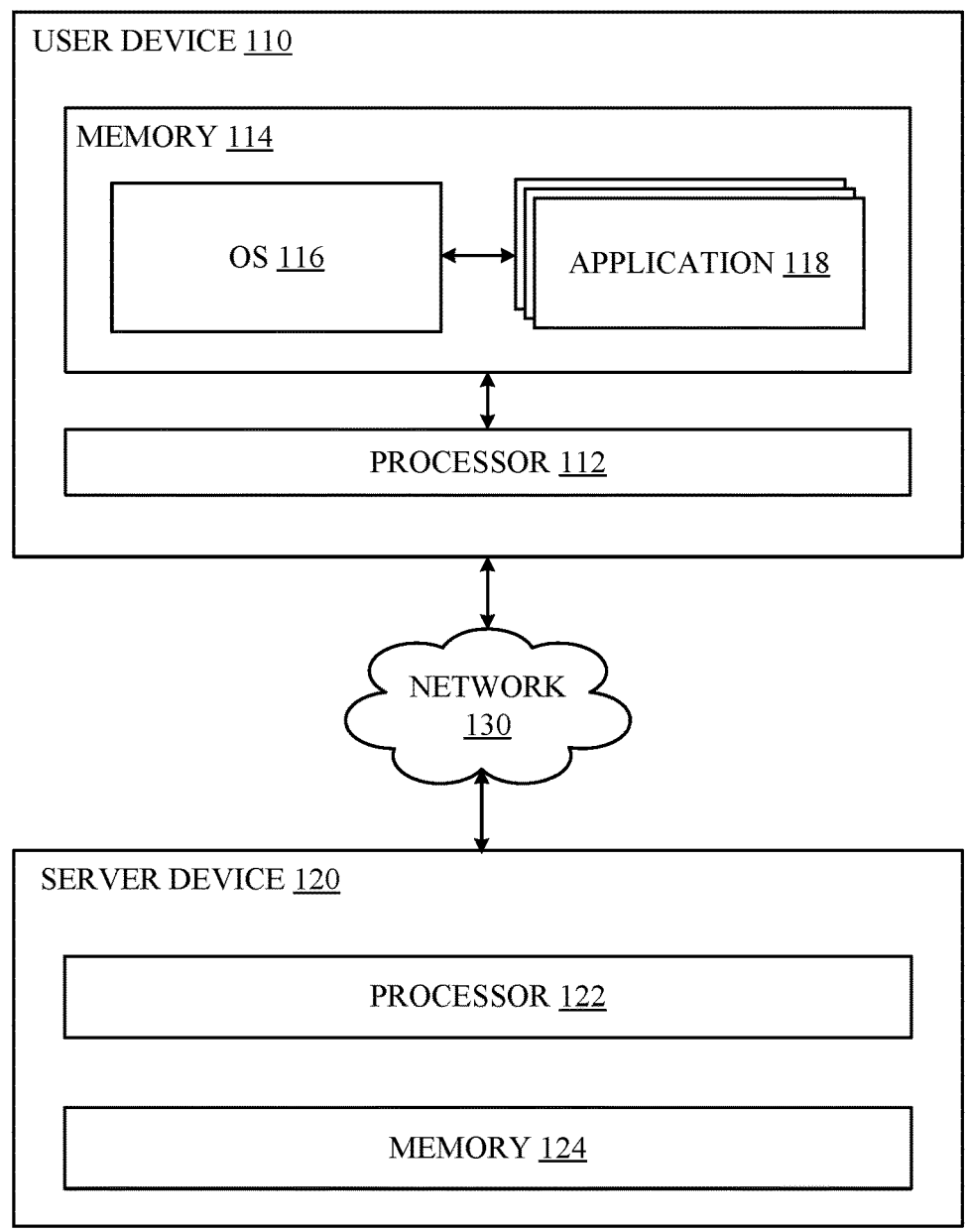
FIG. 1 illustrates a block diagram of different components of a system configured to implement the various techniques described herein, according to some embodiments.

FIG. 1 illustrates a block diagram of different components of a system 100 that is configured to implement the various techniques described herein, according to some embodiments. More specifically, FIG. 1 illustrates a high-level overview of the system 100, which, as shown, includes a user device 110 and a server device 120. The user device 110 can represent a computing device (e.g., a smartphone device, a tablet device, a laptop computer, a desktop computer, a wearable device, a vehicle infotainment system that communicates with a smartphone or other device, etc.). A processor (or CPU) 112, in conjunction with the memory 114, can implement an operating system (OS) 116 configured to execute various applications 118 (e.g., native OS applications and user applications) and other processes/services on the user device 110. Similarly, the server device 120 can include a processor 122/memory 124 to execute an OS/different applications for carrying out the various techniques described herein.

According to some embodiments, applications 118 can include a search application that is configured to receive search queries as input (e.g., from a user or another application 118) and provide search results based on the search queries. In one embodiment, the search application can include a map-based search application that is configured to: (i) receive, display, and store map data (e.g., data related to various points of interest at or within a particular geographical region, driving directions, and/or other location-based data), and (ii) receive search queries pertaining to particular categories (e.g., food, drinks, restaurants, etc.) of interest and provide location-specific search results for the queries. In some embodiments, the map-based search application is configured to: (i) store map data, and (ii) receive a user command to select a category (e.g., restaurants, drinks, etc.) from a list. In some embodiments, in response to receiving either search queries or a user command to select a category, a graphical user interface (GUI) of the map-based search application can display a list of restaurants that are located within a particular geographical region (e.g., near the current location of the user device 110). In particular, the GUI can display a combined map/listing view where a listing of the various restaurants in the particular geographical region is displayed in one portion of the GUI (e.g., second portion 314 of GUI 300 depicted in FIG. 3B) and a map that highlights the locations of the restaurants in the listing is displayed in another portion of the GUI (e.g., first portion 312 of GUI 300 depicted in FIG. 3B). For example, the map can display icons at locations on the map that correspond to the locations of the restaurants. In some embodiments, the GUI can display a list of restaurants based on a user search query that is mutually exclusive to the current location of the user device 110. For example, even if the user device 110 is currently located in Cupertino, Calif., the application can receive a search query for "New York City" and subsequently provide a list of restaurants in New York City.

According to some embodiments, the user device 110 can communicate with a server device 120 via a network 130. The server device 120 can represent a computing device that is configured to (i) receive location data from the user device 110, (ii) receive search data in response to search queries, (iii) determine a number of search results that are based on the search queries, (iv) provide a number/list of suggestions that can assist the user in filtering/refining the search results, and (v) provide the search results and the suggestions to the map-based application of the user device 110. The network 130 can include one or more of the Internet, an intranet, a PAN (Personal Area Network), a LAN (Local Area Network), a WAN (Wide Area Network), a MAN (Metropolitan Area Network), a wireless communication network, and other networks or combination of networks.

Figure 2:
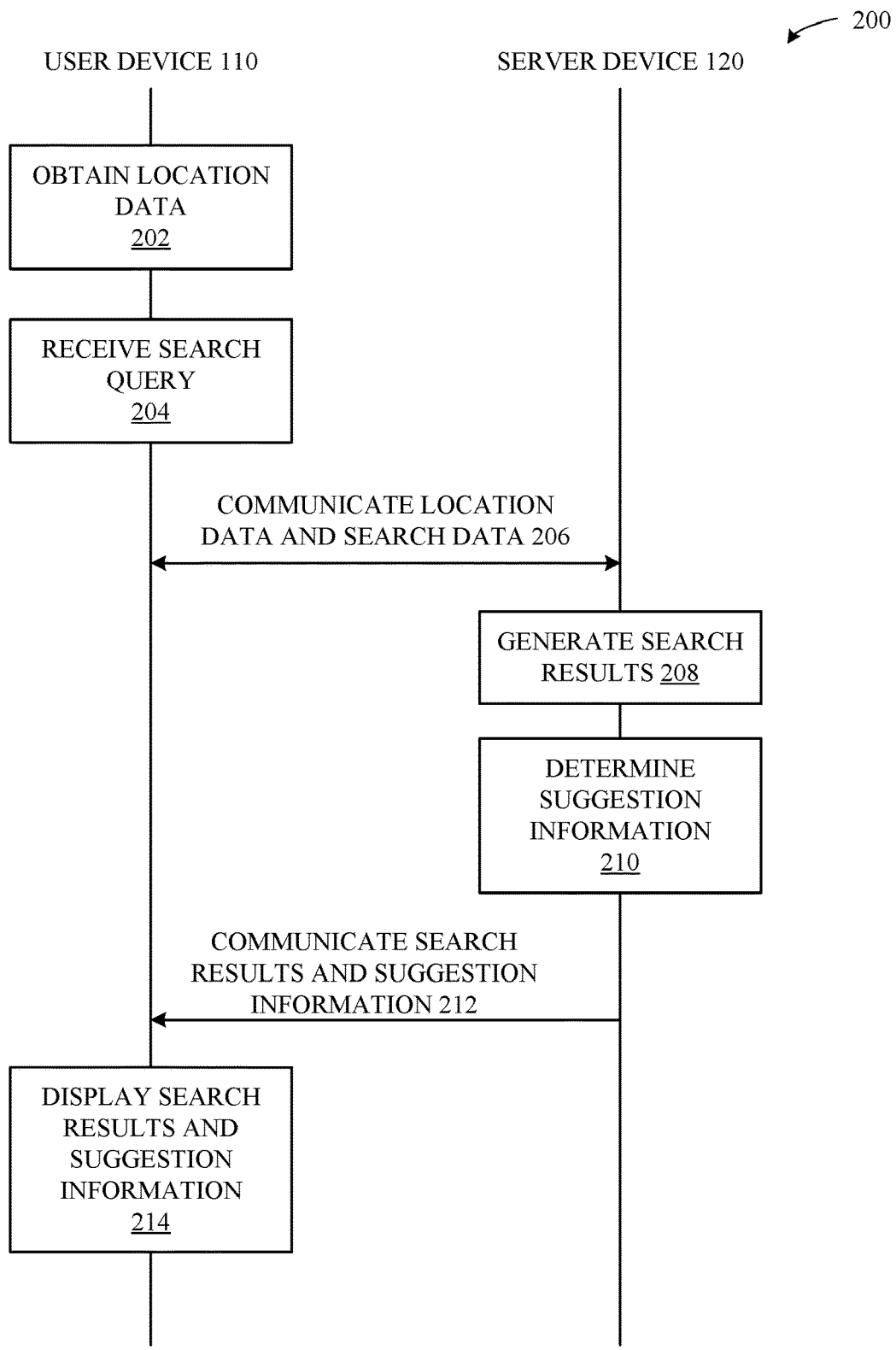
FIG. 2 illustrates a sequence diagram of a method for refining search results displayed at the user device of FIG. 1, according to some embodiments.
Figure 3A:
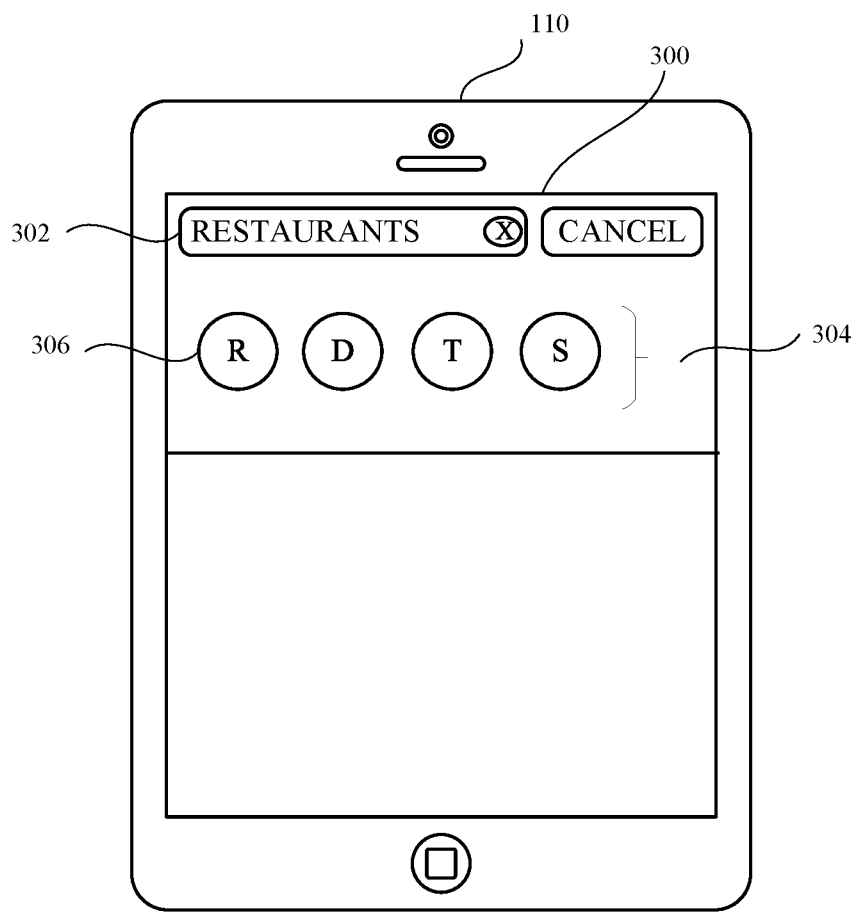
FIGS. 3A-3E illustrate conceptual diagrams of example graphical user interfaces that enable a user to input search queries and receive suggestion information at the user device of FIG. 1, according to one embodiment.

FIG. 2 illustrates a sequence diagram of a method 200 for refining search results associated with a particular geographic region, according to some embodiments. As shown in FIG. 2, at step 202, the user device 110 obtains location data that includes a current location of the user device 110. The location data can be received or originate from a Global Positioning System (GPS), nearby WiFi base stations, and/or nearby cell towers. In some embodiments, upon receiving the location data, the user device 110 can automatically transmit the location data to the server device 120. At step 204, the user device 110 receives a search query (e.g., from the map-based search application as shown in FIG. 3A). In some embodiments, the search query can include an input by a user in a search box 302 provided in the GUI. In some embodiments, the search query can include a selection of a particular category from a first list of categories 304 that is displayed within the GUI of the application. For example, the user can select the "restaurants" category 306 from the first list of categories 304 including but not limited to restaurants (R), drinks (D), shopping (S), travel (T), etc. The selection can also include a user gesture (e.g., a finger tap on a category icon associated with the particular category). The search query can also include other forms of input, e.g., voice input.

Referring back to FIG. 2, at step 206, the user device 110 provides the location data and search data (also referred to herein as "input data") to the server device 120. The search data includes the search query input by the user (via the search box 302, the selection of the category 306 via the category icon, or other forms of input). At step 208, the server device 120 receives the search data and the location data. The server device 120 can then determine search results that are relevant to the location data and the search data. Subsequently, the server device 120 generates a list of the search results that satisfies at least one of the location data or the search data. For example, when the user selects the "restaurants" category 306, the server device 120 generates a list of restaurants that are located within a particular geographical region defined by the location data. The geographical region can include a point or area at or near the current location of the user device 110. In some embodiments, the server device 120 can transmit the list of the search results to the application on the user device 110.

At step 210, the server device 120 determines suggestion information associated with the search query. Any approach can be used to determine the suggestion information, e.g., keyword-based matching, location-based matching, sponsored advertisement-based matching, user-preference-based matching, and the like. The suggestion information can include a number/list of suggestions/options related to the search query that can assist the user in filtering/refining the search results. In some embodiments, the suggestion information can include a second list of categories associated with the search query and/or category selected from the first list of categories. For example, when the "restaurants" category 306 is selected, the second list of categories can include different types of cuisines (e.g., American, Italian, Mexican, Burgers, etc.) that are available within the geographical region defined by the location data. In other words, the server device 120 generates intelligent suggestions/options that enable the user to efficiently narrow down the search results and rapidly locate particular search results of interest. Also, the suggestions/options are dynamically generated based on the search data and the location data. In some implementations, the suggestion information can include the second list of categories and a subset of search results that corresponds to each category in the second list of categories. For example, the suggestion information can include categories for the different types of cuisines (e.g., American, Italian, etc.) and a subset of search results associated with each cuisine category (e.g., a first subset of search results for American cuisine, a second subset of search results for Italian cuisine, and so on).

Figure 3B:
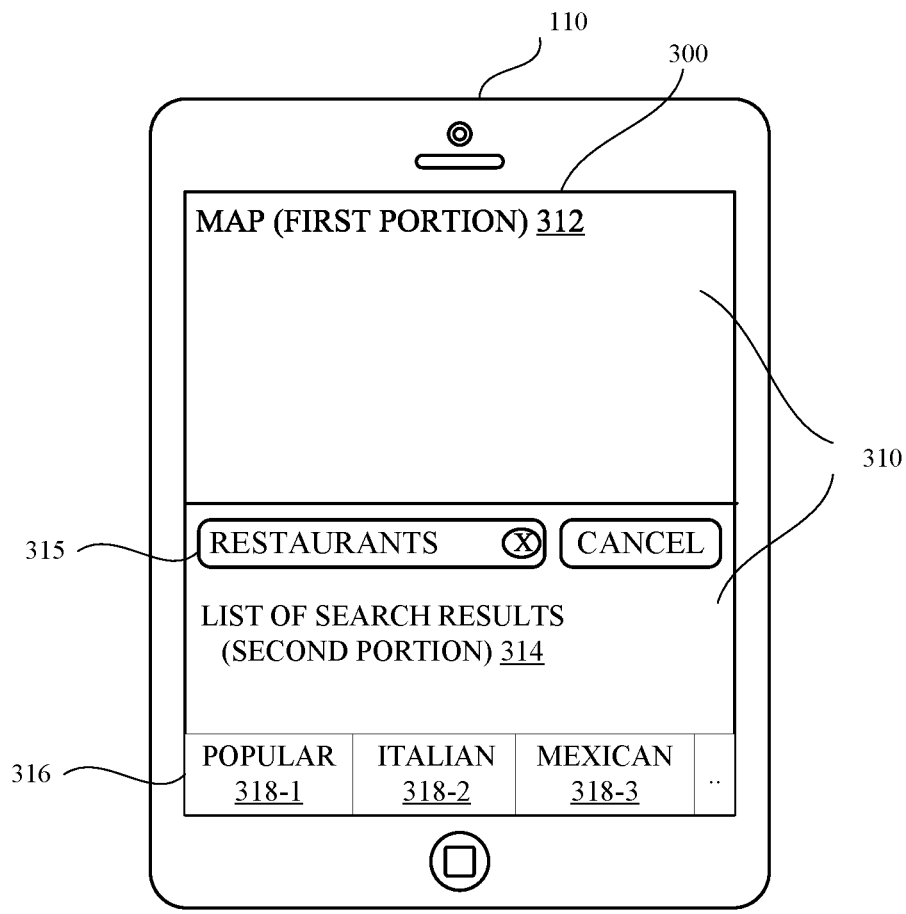

At step 212, the server device 120 provides the search results and the suggestion information to the user device 110. At step 214, the user device 110 displays the search results and the suggestion information within the GUI 300 of the map-based search application. In some embodiments, the search results and the suggestion information is presented in a combined map/list view 310 as shown in FIG. 3B, for example. As shown in FIG. 3B, the map is displayed in a first portion 312 of the GUI 300. In other words, the first portion 312 of the GUI displays an image representing the geographic region defined by the location data. The listing of the search results (e.g., listing of restaurants within the geographic region) is displayed in a second portion 314 of the GUI 300. The first portion 312 of the GUI 300 also displays icons corresponding to the location of the restaurants. Also depicted in FIG. 3B is a scrollable category list 316 that includes the second list of categories (i.e., cuisine categories). The scrollable category list 316 includes selectable icons 318-1, 318-2, 318-3 (also referred to herein as selectable icon/icons 318) for each category (e.g., Popular, Italian, Mexican, etc.) in the second list of categories. While the disclosure depicts the scrollable category list 316 as a scrollable bar with selectable icons or buttons, other graphical forms of scrollable category lists that are responsive to a swipe gesture or other gesture at the GUI 300 can be utilized without departing from the scope of this disclosure. In some implementations, the selectable icons 318-1, 318-2, and 318-3 of the scrollable category list 316 can be scrolled through horizontally. However, the selectable icons 318-1, 318-2, and 318-3 can be manipulated in various other ways (e.g., by scrolling through vertically, by providing an expanded selectable area, etc.) without departing from the scope of this disclosure. By scrolling through the scrollable category list 316, the application can display a full list of selectable icons for each category.

According to some embodiments, when a selectable icon 318-1, 318-2, or 318-3 is selected, the user device 110 can generate a new/refined search query in accordance with the selected icon/category and transmit the new/refined search query to the server device 120. Subsequently, the server device 120 can utilize a filter to narrow the number of search results to be relevant to the new/refined search query. For example, if a user selects "Italian" 318-2, then the user device 110 can transmit the search query "Italian." Thereafter, the server device 120 can determine suggestions for restaurants that are categorized as Italian, and provide those suggestions to the user device 110 to be displayed within the application. In some implementations, the server device 120 performs a new search for a subset of search results that is relevant to the current location of the user device 110 and that corresponds to the selected icon/category.

In some implementations, prior to selection of any selectable icon 318 in the scrollable category list 316, the second portion 314 of the GUI 300 displays a broad list of search results (i.e., a number of restaurants) in the geographic region. Thereafter, when the user selects a particular selectable icon 318 in the scrollable category list 316, the user device 110 sends a new search query that includes the sub-category associated with the selected icon 318 to the server device 120. In response, the server device 120 generates a subset of search results corresponding to the selected sub-category and sends the subset of search results to the user device 110. The subset of search results is displayed in the second portion 314 of the GUI 300. For example, when the user selects an icon 318-2 corresponding to "Italian" cuisine sub-category, the second portion 314 of the GUI 300 is updated to display Italian restaurants within the particular geographic region. Similarly, when the user selects an icon 318-3 corresponding to "Mexican" cuisine sub-category, the second portion 314 of the GUI 300 is updated to display Mexican restaurants, and so on. In some implementations, the map in the first portion 312 of the GUI is also updated to display icons corresponding to the locations of the Italian restaurants and Mexican restaurants, respectively, according to the selections. In other words, the geographic region/map view depicted in the first portion of GUI 300 remains the same across the various category selections and only the icons corresponding to the location of the restaurants changes based on the selections.

In some implementation, when the user moves the viewport on the map to a different location (for example, move the view to New York from San Francisco), the suggestion information and the associated search results are updated to reflect the new geographic region. In other words, the selectable icons 318 are updated to correspond to categories that are available in the new geographic region.

Figure 3C:
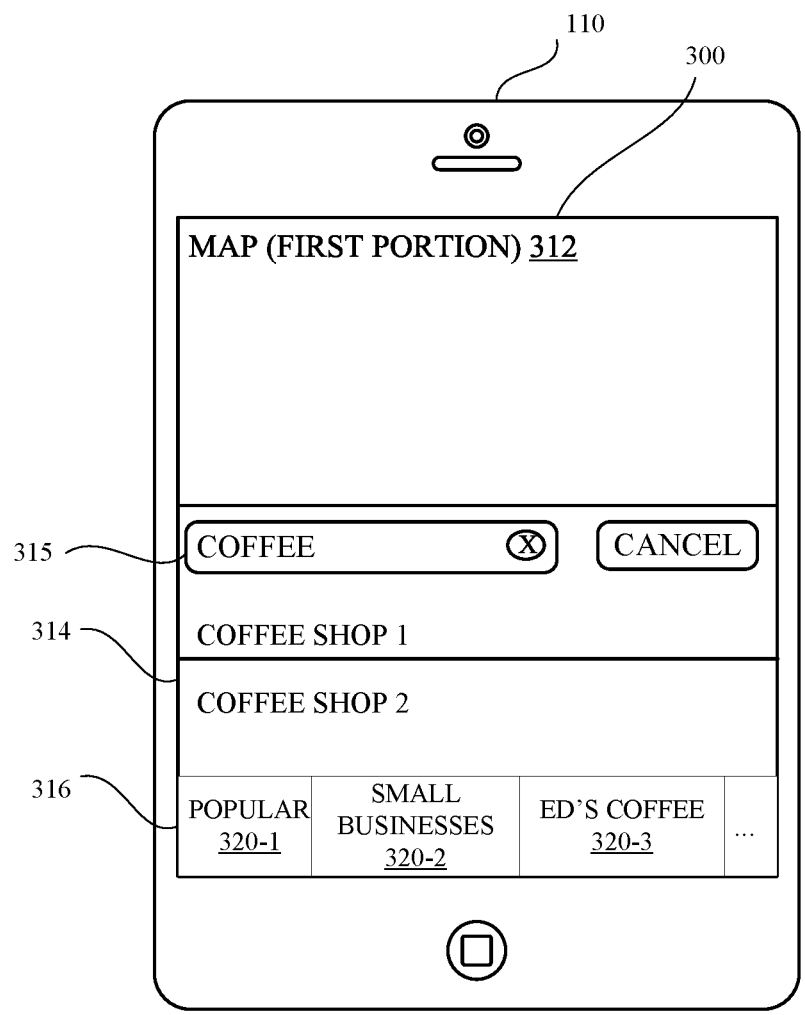
Figure 3D:
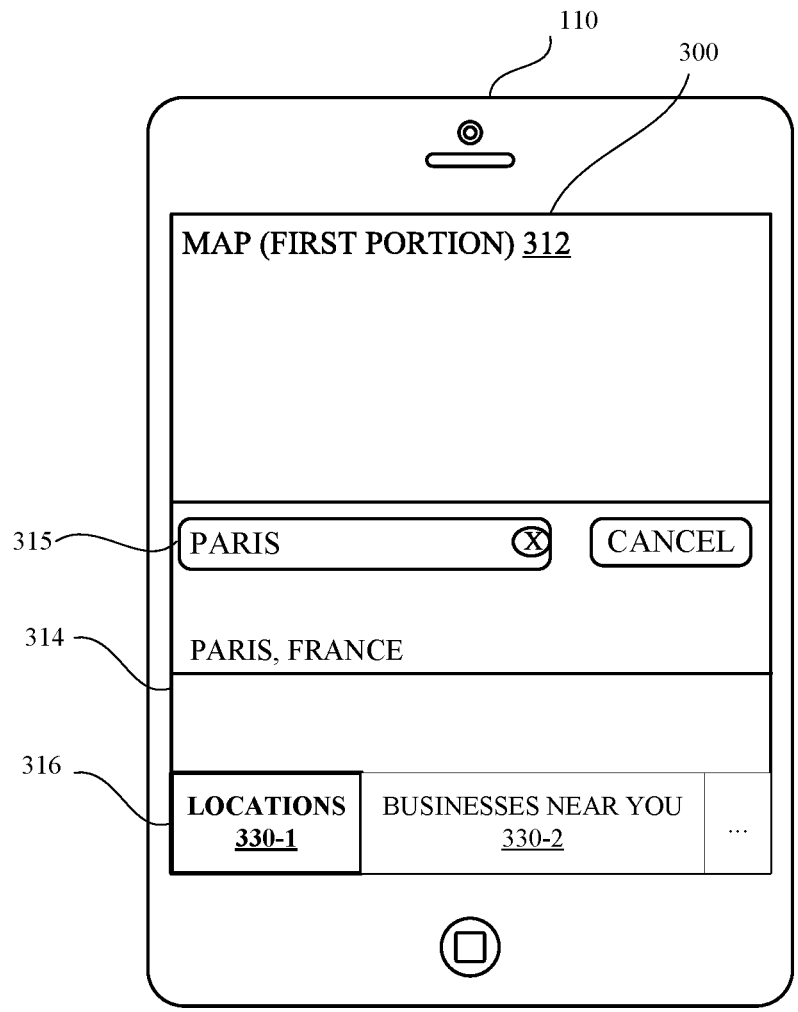
Figure 3E:
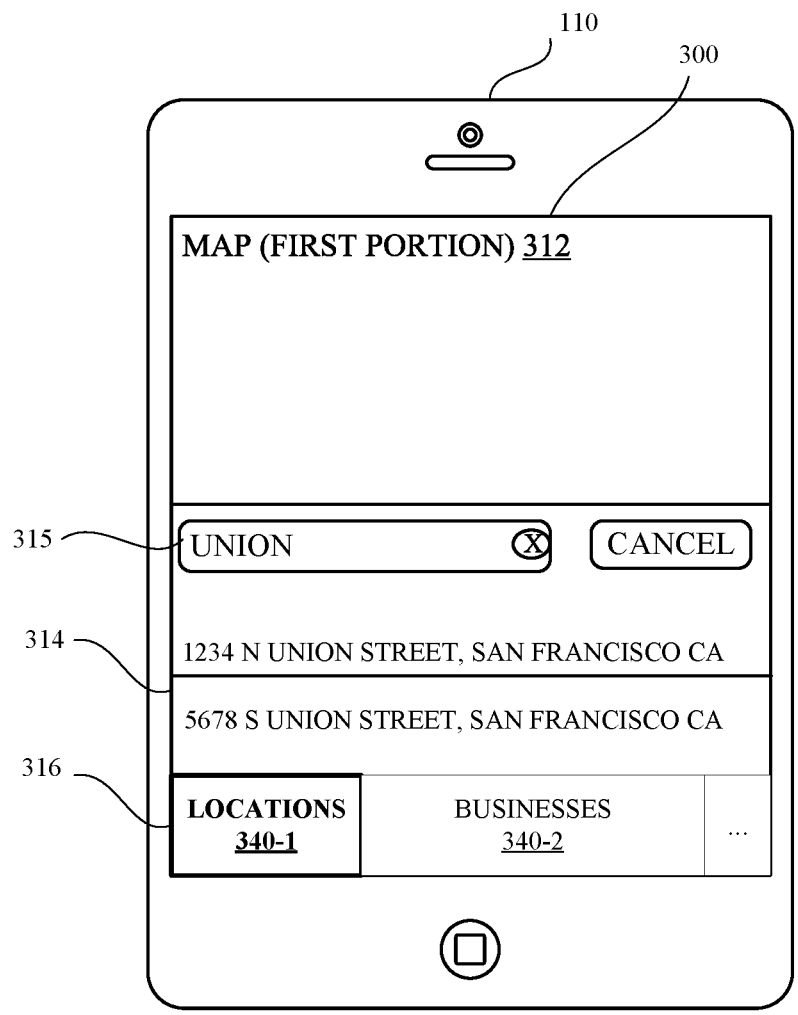

FIGS. 3C-3E illustrates example GUIs 300 that depict different scrollable category lists 316 based on different types of search queries input by the user. For example, FIG. 3C depicts a scrollable category list 316 that is generated for the search query "coffee". The scrollable category list 316 includes selectable icons 320-1, 320-2, 320-3 for each category (e.g., Popular, Small Business, Ed's Coffee, etc.) related to the search query "coffee". When the user selects icon 320-1, the second portion 314 of the GUI 300 is updated to display popular coffee shops in the particular geographic region that is defined by the location data. Similarly, when the user selects icon 320-2, the second portion 314 is updated to display small coffee shops (e.g., non-franchise or non-chain based businesses), and when the user selects the icon 320-3, the second portion 314 is updated to display all Ed's Coffee shops (i.e., chain-based coffee shops) in the particular geographic region.

In some implementations, when a user inputs ambiguous search queries, the server device 120 intelligently generates the suggestion information/list of suggestions (that are presented in the scrollable category list 316) that can help disambiguate the queries. For example, as shown in FIG. 3D, when the user enters the query "Paris" in search box 315, the user could be searching for the location "Paris" or businesses that have the word "Paris" in their names. Accordingly, a scrollable category list 316 is presented that includes a first selectable icon 330-1 for displaying locations and a second selectable icon 330-2 for displaying businesses within the geographic region that have the word "Paris" in their name. Similarly, when the user enters the query "Union", the user can be provided with the scrollable category list 316 that includes a first selectable icon 340-1 for locations and a second selectable icon 340-2 for businesses within the geographic region that have the word "Union" in their name. For example, FIG. 3E depicts street names with "Union" being presented in the second portion 314 of the GUI 100 when the selectable icon 340-1 is selected. As shown in FIGS. 3D and 3E, the first selectable icons 330-1 and 340-1, respectively, are highlighted or bolded indicating that the "locations" category is selected. Moreover, as depicted in FIGS. 3C-3E, the suggestion information can include different types of suggestions instead of or in addition to categories or sub-categories (e.g., brands/chains, locations, businesses, etc.).

In this manner, the scrollable category list 316, depicted in FIGS. 3B-3E, allows the user to rapidly locate search results of interest without having to use the keyboard to specifically type time consuming multi-word search queries, thereby considerably enhancing the user's search experience. Moreover, the second list of categories included in the scrollable category list 316 is dynamically generated based on categories (related to the search query in the search box 315, for example) that are available within the geographical region defined by the location data. In other words, the scrollable category list 316 is dynamic and changes across different search queries and different locations. For example, if the user is searching for restaurants in a particular geographic region, the server device 120 may determine that American and Italian restaurants are available in the region (but no Mexican restaurants are available) and may generate the second list of categories which includes only categories for American cuisine and Italian cuisine. In some embodiments, the second list of categories can include sub-categories (e.g., American cuisine, Italian cuisine, etc.) associated with the main category included in the search query (e.g., restaurants). In some embodiments, the second list of categories can include related categories/suggestions (e.g., locations, businesses, etc.) that are related to the keyword included in the search query (e.g., Union), and/or other categories or suggestions. As such, the scrollable category list 316 provides the users with a number of intelligent options to choose from regardless of whether the search query is ambiguous or whether the user's intent is known.

Figure 4:
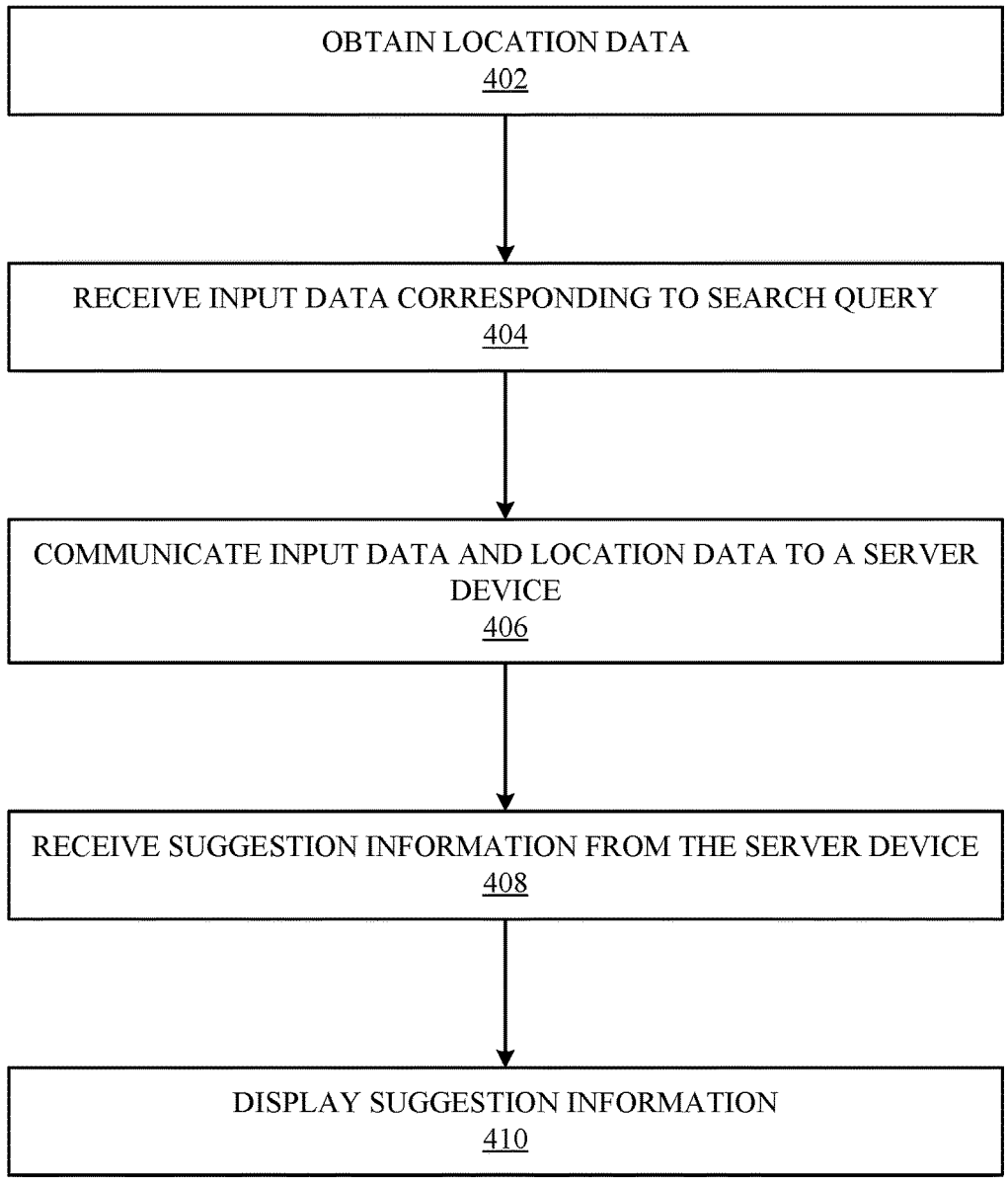
FIG. 4 illustrates a method that is carried out at the user device of FIG. 1, according to one embodiment.

FIG. 4 illustrates a method 400 that is carried out by the user device 110 of FIG. 1, according to one embodiment. As shown, the method 400 begins at step 402, where the user device 110 obtains location data that includes a current location of the user device 110. At step 404, the user device 110 receives input data corresponding to a search query. For example, the input data can include a keyword typed by the user in the search box 315 presented in the GUI 300. The input data can include a selection of a category (e.g., restaurants) from a first list of categories 304 (e.g., restaurants, drinks, travel, etc.) presented in the GUI 300. In some implementations, the first list of categories 304 can include a static list of predefined categories.

At step 406, the user device 110 provides the input data and the location data to the server device 130. At step 408, the user device 110 receives suggestion information from the server device 120. The suggestion information can include the second list of categories (e.g., Popular, American, Italian, etc.) and the subset of search results that corresponds to each category in the second list of categories. For example, the subset of search results can include search results associated with each cuisine category (e.g., a first subset of search results for American cuisine, a second subset of search results for Italian cuisine, and so on).

At step 410, the user device displays the suggestion information in the GUI 300 of the map-based search application, for example. The second list of categories are displayed as the scrollable category list 316 that includes icons 318 corresponding to the different cuisines available in the geographic region defined by the location data. In response to a selection of a particular category/icon from the scrollable category list 316, the second portion 314 of the GUI is modified/updated to display the subset of search results corresponding to the selection.

In some implementations, a usage log is maintained at the user device 110 (e.g., in memory 114) that tracks information regarding the user's interactions with the map-based search application within the particular geographic region. The tracked information can include, but is not limited to, queries input by the user, category selections made by the user (e.g., category selections from the first list of categories or the second list of categories), selections of search results (from the subset of search results displayed in the second portion 314 of the GUI 300), and the like. In some implementations, when the user selects a particular search result from the subset of search results, the usage log is modified to include an entry that provides a correspondence between the search result and the associated category/query.

In some embodiments, the icons 318 in the scrollable category list 316 are ordered according to a relevance metric. In some implementations, the user device 110 sends the usage log to the server device 120 to facilitate derivation of the relevance metric.

Figure 5:
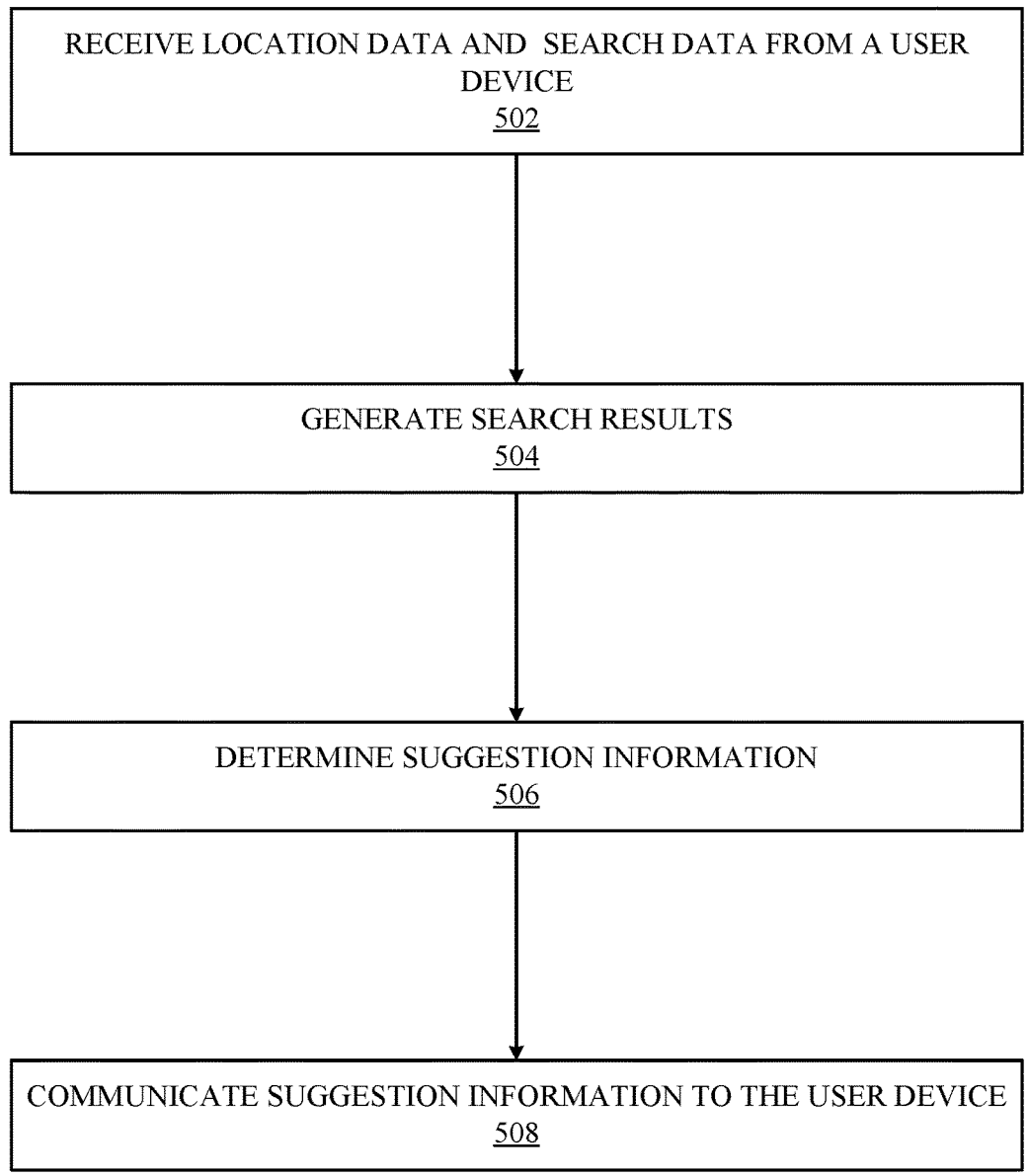
FIG. 5 illustrates a method that is carried out at the server device of FIG. 1, according to one embodiment.

FIG. 5 illustrates a method 500 carried out by the server device 120 of FIG. 1, according to one embodiment. As shown, the method 500 begins at step 502, where the server device 120 receives, from the user device 110, location data associated with the user device 110 and search data for identifying locations of interest within a geographic region corresponding to the location data. The location data can include the current location of the user device. The search data can include the search query input by the user via the search box 315 in GUI 300 or the selection of the category (e.g. "restaurants" category 306) from the first list of categories 304). At step 504, the server device 120 generates search results that satisfy the search data. For example, the server device 120 can generate a broad list of search results for the search data.

At step 506, the server device 120 determines suggestion information associated with the search data. The suggestion information includes the second list of categories associated with the search data. The suggestion information can include the second list of categories (e.g., American, Italian, etc.) and the subset of the search results (i.e., subset of the broad list of search results generated in step 504) that corresponds to each category in the second list of categories. For example, the subset of search results can include search results associated with each cuisine category (e.g., a first subset of search results for American cuisine, a second subset of search results for Italian cuisine, and so on).

In some implementations, the suggestion information is determined by analyzing aggregated search logs that correspond to the geographic region. The aggregated search logs are stored at the server device 120 and include usage logs collected from a number of user devices associated with a number of users. In other words, usage logs associated with the geographic region are collected from a number of users and aggregated to form aggregated search logs. For example, when the usage log associated with user device 110 is received, the server device 120 stores the usage log in association with a portion of the aggregated search logs that correspond to the geographic region (i.e., the region the user is performing the search in). The usage logs collected from the number of users provide insight into the importance of certain categories or businesses within the geographic region based on the users' interaction with the search application at the respective user devices. For example, when a number of users select a particular search result (e.g., category or business) within the geographic region, a determination can be made that the search result is important for the associated search query. Thus, the usage logs provide information about categories that the various users are searching for or have selected in the geographic region, businesses that have been selected in the geographic region, and the like. In some implementations, the usage logs can be used to determine a list of top businesses in the geographic region based on user interaction, where the businesses in the list can be divided by category, geographical regions (e.g., based on the Geohash geocoding system), popularity, and/or other metrics.

In some implementations, the server device 120 can implement machine learning algorithms for the purpose of providing intelligent suggestions. The server device 120 can generate a model based on training data, where the training data includes information from the aggregated search logs. For example, the training data can include the list of top businesses in the geographic region based on user interaction (from the aggregated search logs) and a total number of business in the geographic region (from a separate set of all businesses in the geographic region).

In some implementations, when the server device 120 receives the location data and the search data from the user device 110, the server device 120 analyzes the information obtained/determined from the aggregated search logs to intelligently determine the suggestion information (e.g., the second list of categories) that is relevant to the search data. In some implementations, the location data and the search data are provided as input to the machine learning algorithm that, in turn, generates the suggestion information (i.e., second list of categories). In some implementations, the server device 120 can implement a rating system for rating the relevance of the generated categories. The rating can be provided by human raters, where the rating is used as feedback to improve the model. In some implementations, in addition to or instead of the human rating, live feedback (in the form of usage logs) can be received from the users of the search application (across multiple devices) to continuously improve the model so that better suggestions can be provided. In some implementations, a weight-based system can be utilized where the weight assigned to the human rating can be lower than the weight assigned to the live feedback. In some implementations, the rating/feedback is applied until a certain threshold is reached implying that sufficient information has been gathered for the particular search query/category.

Referring back to FIG. 5, at step 508, the server device 120 provides the suggestion information to the user device 110. The suggestion information is presented via the scrollable category list 316 in the GUI 300 of the search application. In some implementations, the suggestions/categories associated with the suggestion information (e.g., the second list of categories) are ordered according to a relevance metric. The relevance metric is tracked by the server device 120 based on the users' interaction information obtained from the usage logs/aggregated search logs. The relevance metric is computed for a particular query and suggestion/category (i.e., individual item in the second list of categories or suggestions) combination. The relevance metric is computed based on a number of factors, such as, (1) historical popularity based on a number of times a particular category of the second list of categories has been previously selected/ interacted with by the number of users for the particular query, (2) density of businesses in the geographic region for the particular category, (3) query reformulations from the aggregated search logs, and (4) category popularity in the geographic region (e.g., popularity of a particular chain of coffee shops in the geographic region). For example, when a number of users select (i.e. tap on) the particular category in the geographic area in comparison to other categories, a determination is made the particular category is more popular than the other categories and a value corresponding to the number of times the particular category has been selected is incremented. In some implementations, the position of the category in the scrollable category list 316 is determined based on the value. For example, when the value/relevance metric indicates that the particular category is very popular, the category can be positioned at or near the beginning of the scrollable category list 316. In other words, the position of the category in the scrollable category list 316 can dynamically change based on the relevance metric associated with the category. In one example, the server device 120 can learn by taking into account how accurate the server device 120 was in providing category suggestions in response to search queries. For example, if everyone picks Maria's Tacos in response to a search query for "Mexican", the server device 120 can learn that users in the geographic region prefer Maria's Tacos and associate that restaurant listing with a high ranking value so that the restaurant is displayed as a top suggestion within the list.

Figure 6:
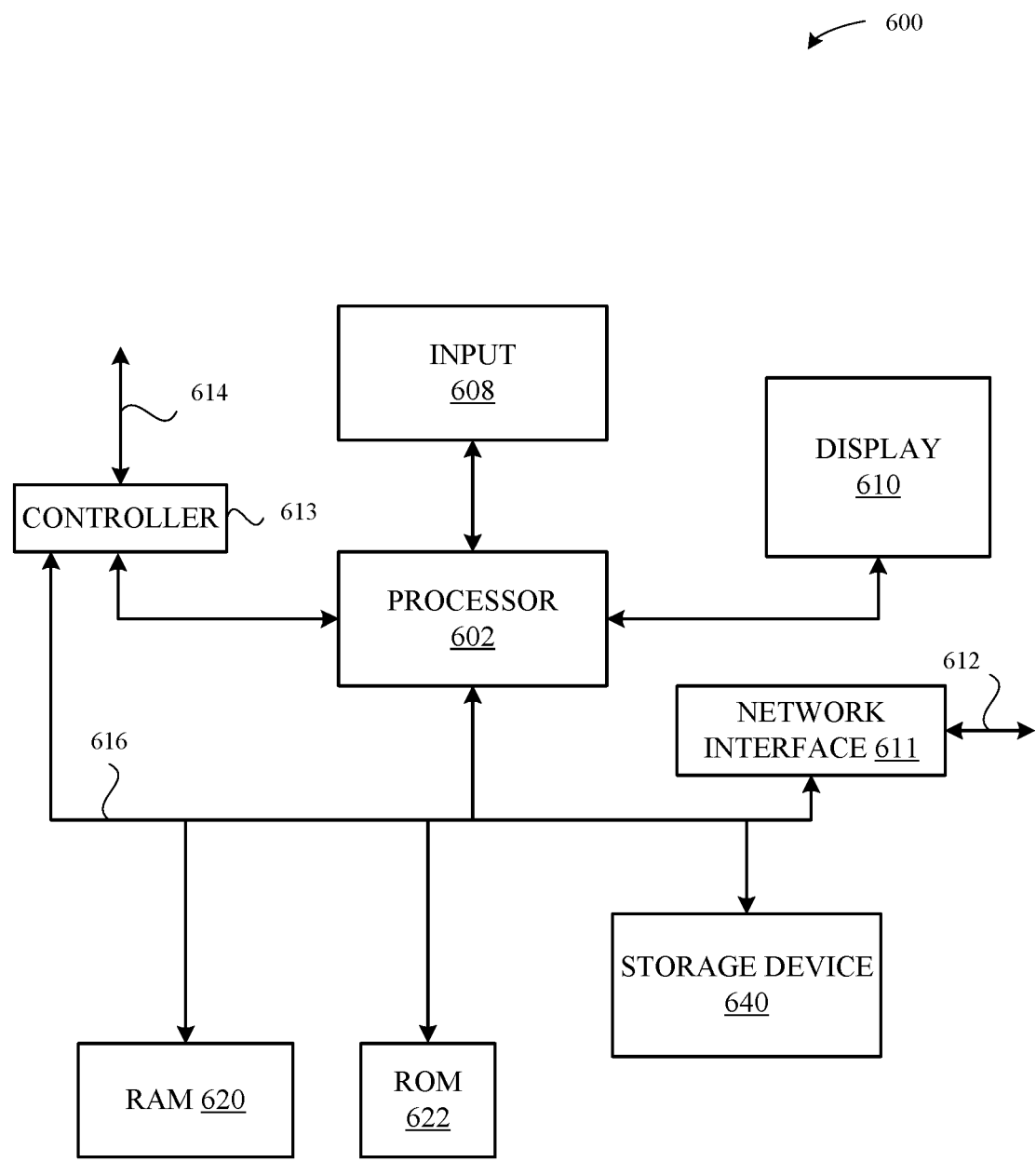
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the first device 110 or second device 120 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user (for example, email interface described herein). A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device comprising:
   a processor; and
   a memory configured to store instructions that, when executed by the processor,
   cause the computing device to perform operations that include:
   sending, to a server device, input data corresponding to a selection of a category from a first list of categories displayed at an interface of a search application that provides search results for a geographic region; and
   receiving, from the server device in response to the input data, a list of suggestions that is associated with the input data and the geographic region and ordered according to a relevance metric, wherein the list of suggestions includes a second list of categories associated with the first list of categories;
   receiving a selection of a second category from the second list of categories;
   receiving a selection of a search result from a subset of search results displayed at the interface of the search application, the subset of search results associated with the selection of the second category;
   modifying a usage log stored in the memory to indicate a correspondence between the search result and the second category; and
   sending the modified usage log to the server device to facilitate derivation of the relevance metric using the modified usage log.

2. The computing device of claim 1, wherein the relevance metric is computed based on a number of times a particular suggestion of the list of suggestions has been previously selected at one or more computing devices associated with different users.

3. The computing device of claim 1, wherein the operations further include:
   modifying the interface of the application to include the subset of search results associated with the selection of the second category.

4. The computing device of claim 3, wherein the operations further include:
   modifying the usage log stored in the memory to include an entry that indicates the correspondence between the search result and the second category.

5. The computing device of claim 4, wherein the search application is a map-based search application.

6. The computing device of claim 5, wherein the operations further include:
   simultaneously displaying a map of the geographic region and a scrollable category list that includes the list of suggestions, wherein the second list of categories within the list of suggestions includes sub-categories of a selected category within the input data sent to the server device, the sub-categories determined by the server device.

7. The computing device of claim 6, wherein the scrollable category list is responsive to a swipe gesture at the interface of the application and the scrollable category list includes icons corresponding to the first sub-category and the second sub-category.

8. A method for refining search results based on a geographic region, the method comprising:
   by a computing device:
   sending location data and a search query over a network connection, wherein the search query comprises first category data associated with a search within the geographic region that is defined by the location data;
   receiving, via the network connection, search results corresponding to the first category data, and second category data associated with the first category data and the geographic region, wherein the second category data includes a first sub-category and a second sub-category for the first category data;
   sending, via the network connection, a second search query that comprises the first sub-category and the second sub-category;
   receiving, via the network connection, a first subset of the search results associated with the first sub-category and a second subset of search results associated with the second sub-category; and
   displaying, at a graphical interface of a search application, the first subset of the search results when the first sub-category is selected and the second subset of search results when the second sub-category is selected.

9. The method of claim 8, further comprising:
   simultaneously displaying, at the graphical interface, a first icon corresponding to the first sub-category and a second icon corresponding to the second sub-category.

10. The method of claim 8, further comprising:
    receiving, at the graphical interface, a selection of an entity in the first subset of the search results subsequent to the first sub-category being selected; and
    updating a usage log to include an entry that associates the entity with the first sub-category.

11. The method of claim 10, further comprising:
    sending the usage log over the network connection to a server after updating the usage log.

12. The method of claim 8, further comprising:
    in response to receiving the second category data, simultaneously displaying icons corresponding to the first sub-category and the second sub-category in a scrollable portion of the graphical interface.

13. The method of claim 12, further comprising:
sending different location data over the network connection in response to adjusting a portion of the graphical interface that includes a map;
receiving additional category data that includes a third category; and
incorporating an additional icon into the scrollable portion of the graphical interface, the additional icon corresponding to the third category.

14. The method of claim 8, wherein the second category data is dynamically updated based on the location data.

15. A non-transitory computer readable medium configured to store instructions that when executed by a processor of a computing device, cause the computing device to perform operations that include:
receiving, from a mobile device that is operating a search application, location data corresponding to a geographic region;
receiving, from the mobile device, search data for identifying locations of interest within the geographic region;
analyzing aggregated search logs stored at the computing device based on the search data to identify at least one category associated with the search data;
sending, to the mobile device, suggestion information that includes the at least one category;
receiving, from the mobile device, input data indicating that the at least one category was selected at an application of the mobile device; and
incrementing a value corresponding to a number of times the at least one category was selected at the application.

16. The non-transitory computer readable medium of claim 15, wherein the operations further include:
receiving a usage log from the mobile device, the usage log comprising the input data indicating that the at least one category was selected at an application of the mobile device, the usage log including an entry that associates the at least one category with an entity selected at the application on the mobile device.

17. The non-transitory computer readable medium of claim 16, wherein the operations further include:
storing the usage log in association with a portion of the aggregated search logs that correspond to the geographic region.

18. The non-transitory computer readable medium of claim 17, wherein the operations further include:
generating the aggregated search logs by aggregating data from the usage log with other usage logs associated with the geographic region, the other usage logs received from other mobile devices.

19. The non-transitory computer readable medium of claim 18, wherein the suggestion information includes a plurality of categories that are ordered according to the value.

20. The non-transitory computer readable medium of claim 15, wherein the suggestion information includes a subset of search results corresponding to the at least one category.

* * * * *